United States Patent
Garcia Rodriguez et al.

(10) Patent No.: US 11,956,037 B2
(45) Date of Patent: Apr. 9, 2024

(54) SPATIAL REUSE FOR WIRELESS NETWORK

(71) Applicant: Nokia Technologies Oy, Espoo (FI)

(72) Inventors: Adrian Garcia Rodriguez, Santa Cruz de Tenerife (ES); David Lopez-Perez, Blanchardstown (IE); Lorenzo Galati Giordano, Dublin (IE)

(73) Assignee: Nokia Technologies Oy, Espoo (FI)

( * ) Notice: Subject to any disclaimer, the term of this patent is extended or adjusted under 35 U.S.C. 154(b) by 72 days.

(21) Appl. No.: 17/770,672

(22) PCT Filed: Sep. 29, 2020

(86) PCT No.: PCT/EP2020/077159
§ 371 (c)(1),
(2) Date: Apr. 21, 2022

(87) PCT Pub. No.: WO2021/078475
PCT Pub. Date: Apr. 29, 2021

(65) Prior Publication Data
US 2022/0368391 A1   Nov. 17, 2022

Related U.S. Application Data

(60) Provisional application No. 62/923,870, filed on Oct. 21, 2019.

(51) Int. Cl.
H04B 7/06 (2006.01)
(52) U.S. Cl.
CPC .................. H04B 7/0608 (2013.01)

(58) Field of Classification Search
CPC .... H04B 7/0608; H04B 7/0617; H04B 7/024; H04B 7/0404; H04B 7/0602
USPC ......................................................... 375/267
See application file for complete search history.

(56) References Cited

U.S. PATENT DOCUMENTS

2007/0070914 A1*   3/2007   Abigail ................. H04L 45/121
370/465

OTHER PUBLICATIONS

Lopez-Perez, David, et al., "IEEE 802.11be Extremely High Throughput: The Next Generation of Wi-Fi Technology Beyond 802.11ax", © 2019 IEEE, 6 pgs.

(Continued)

Primary Examiner — Fitwi Y Hailegiorgis
(74) Attorney, Agent, or Firm — Harrington & Smith

(57) ABSTRACT

According to an example aspect of the present invention, there is provided a method, including receiving, by a wireless device of a first wireless network, a control request frame from a second access node of a second wireless network, the control request frame including at least a number of nulls for the wireless device. The wireless device selects a subset of antenna elements, wherein the number of antenna elements is in accordance with the number of nulls for the wireless device, and the antenna elements are selected based on reception powers of antenna elements of at least a frame from a first access node of the first wireless network and/or the second access node of the second wireless network. The wireless device transmits a control response frame with the selected antenna elements, and a data frame to the first access node with the selected antenna elements.

20 Claims, 7 Drawing Sheets

(56) References Cited

OTHER PUBLICATIONS

Lopez-Perez, David, et al., "Coordinated Beamforming/Null Steering Protocol in 802.11be" Sep. 16, 2019, doc.: IEEE 802.11-19/1594r2, 23 pgs.
Garcia-Rodriguez, Adrian, et al., "Coordinated Null Steering for EHT", May 10, 2019, doc.: IEEE 802.11-19/0811r1, 16 pgs.
Schelstraete, Sigurd, et al., "MU sounding improvements", Jul. 8, 2018, doc.: IEEE 802.11-18/1191, 11 pgs.

* cited by examiner

SPATIAL REUSE FOR WIRELESS NETWORK

CROSS REFERENCE TO RELATED APPLICATION

This patent application is a U.S. National Stage application of International Patent Application Number PCT/EP2020/077159 filed Sep. 29, 2020, which is hereby incorporated by reference in its entirety, and claims priority to U.S. provisional application 62/923,870 filed Oct. 21, 2019, which is hereby incorporated by reference in its entirety.

FIELD

Various example embodiments relate to wireless communications, and in particular to spatial reuse mechanisms for wireless networks.

BACKGROUND

A single frequency channel and/or a single carrier frequency may be used by a plurality of at least partially overlapping wireless networks, such as wireless local area networks. In case of shared channels, users tune on the same channel and try to transmit data. To avoid collisions, several techniques exist, such as the carrier sense multiple access (CSMA).

Spatial reuse enables to improve network capacity and algorithms have been studied and proposed for enabling spatial reuse. Directional antennas may be applied for mitigating co-channel interference. In beamforming, phases of the antennas are aligned such that they add up constructively, to provide gain of the signal in a desired direction. In null-steering the phases are aligned to decrease interference caused to devices in other directions. With the increasing number of wireless devices and networks, there are more overlapping networks, and transmissions causing interference to neighbouring networks. There is a demand to further develop and improve technologies facilitating spatial reuse.

SUMMARY

The invention is defined by the features of the independent claims. Some specific embodiments are defined in the dependent claims.

According to a first aspect, there is provided an apparatus, comprising at least one processor, at least one memory including computer program code, the at least one memory and the computer program code being configured to, with the at least one processor, cause the apparatus at least to perform:
receiving, by a wireless device of a first wireless network, a control request frame from a second access node of a second wireless network, the control request frame comprising at least a number of nulls for the wireless device,
selecting, by the wireless device, a subset of antenna elements, wherein
the subset comprises a number of antenna elements, wherein the number of antenna elements is in accordance with the number of nulls for the wireless device, and
the antenna elements are selected to the subset based on reception powers of antenna elements of at least a frame from at least one of a first access node of the first wireless network and the second access node of the second wireless network,
in response to receiving the control request frame and selecting the subset of antenna elements, transmitting, by the wireless device, a control response frame with the selected antenna elements, and
transmitting, by the wireless device, a data frame to the first access node with the selected antenna elements.

According to a second aspect, there is provided a method, comprising: receiving, by a wireless device of a first wireless network, a control request frame from a second access node of a second wireless network, the control request frame comprising at least a number of nulls for the wireless device, selecting, by the wireless device, a subset of antenna elements, wherein
the subset comprises a number of antenna elements, wherein the number of antenna elements is in accordance with the number of nulls for the wireless device, and
the antenna elements are selected to the subset based on reception powers of antenna elements of at least a frame from at least one of a first access node of the first wireless network and the second access node of the second wireless network, in response to receiving the control request frame and selecting the subset of antenna elements, transmitting, by the wireless device, a control response frame with the selected antenna elements, and transmitting, by the wireless device, a data frame to the first access node with the selected antenna elements.

According to still further aspects, there are provided a computer program and a computer-readable medium configured to perform the method in accordance with the second aspect or an embodiment thereof. According to an aspect, there is provided an apparatus comprising means for performing the method of the second aspect or an embodiment thereof.

EMBODIMENTS

Figure 1:
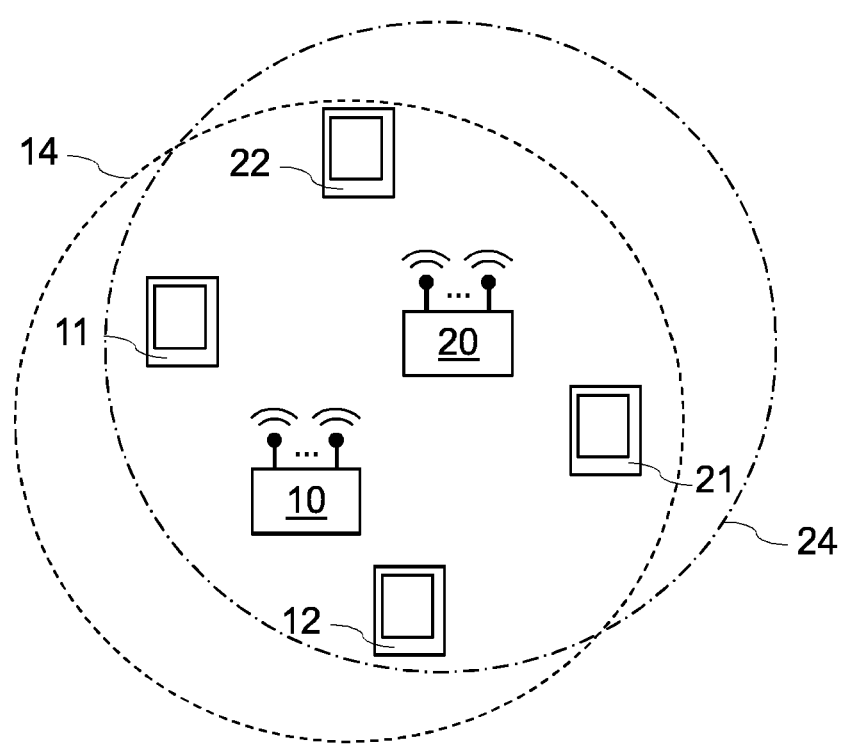
FIG. 1 illustrates a wireless communication system in which at least some embodiments may be applied.

FIG. 1 illustrates an example wireless communication system. The wireless communication devices (or wireless nodes) of FIG. 1 comprise devices or stations 10, 11, 12, 20, 21, 22. In case of IEEE 802.11-based wireless local area networks (WLANs), a station may be associated with a basic service set (BSS) which is a basic building block of IEEE 802.11-based WLANs. The most common BSS type is an infrastructure BSS that includes a single access point (AP) together with all stations (STAs) associated with the AP. The AP may be a fixed AP or a mobile AP.

Devices, such as 10, 20 may thus operate as access nodes and provide access to other networks and/or network elements (not shown), such as another wireless network, Internet and/or a network management system (NMS). In an embodiment, the plurality of BSSs may interconnect to form an extended service set (ESS). Devices 10-22 may comprise multiple antenna elements (may be referred to as multi-antenna (element) devices) and may be configured to utilize their spatial degrees of freedom for beamforming their transmitted signals and/or placing nulls towards coexisting devices.

In case of infrastructure BSS, e.g. device 10 and 20 may be an AP configured to provide a coverage area or BSS 14 and 24, respectively. In some example embodiments, as further illustrated below, stations 11, 12, 21, and 22 are non-AP stations (referred below to as STAs) and stations 10 and 20 are APs (referred to as APs).

In WLANs the medium access control (MAC) layer communicates with the physical layer convergence protocol (PLCP) sublayer via primitives (a set of "instructive commands" or "fundamental instructions") through a service access point (SAP). When the MAC layer instructs it to do so, the PLCP prepares MAC protocol data units (MPDUs) for transmission. The PLCP minimizes the dependence of the MAC layer on the physical medium dependent (PMD) sublayer by mapping MPDUs into a frame format suitable for transmission by the PMD. The PLCP also delivers incoming frames from the wireless medium to the MAC layer. The PLCP appends a PHY-specific preamble and header fields to the MPDU that contain information needed by the physical layer transmitters and receivers. The 802.11 standard refers to this composite frame (the MPDU with an additional PLCP preamble and header) as a PLCP protocol data unit (PPDU).

Null steering is a technique that can be used to further reduce interference and facilitate spatial reuse. Radiation null(s) may be placed towards one or more other devices to reduce interference to/from these devices in certain area or vector or direction. Null steering requires channel state information (CSI) from the devices to which the nulls should be steered. In order to perform steering, combined effect (phase and amplitude) of the channel as well as that by the transceiver hardware need to be known. The combined channel effect in some methods is measured using calibration signals and providing feedback on how the channel is seen by the remote device. In OFDMA, the channel feedback will be measured per subcarrier, or group of subcarriers. A calibration, or sounding, frame exchange may be performed to obtain such channel information.

A beamformer utilizes the information of the MIMO channel to generate a steering matrix that improves reception in the beamformee. The beamforming steering matrix, computed (or updated) from a new channel measurement, replaces an existing matrix for subsequent beamformed data transmission. There are several methods of beamforming, differing in the way the beamformer acquires the knowledge of the channel matrices and on whether the beamformer generates or the beamformee provides feedback information for the beamformer to generate the steering matrix. In IEEE 802.11 based systems implicit feedback beamforming (fb bf) and explicit fb bf may be performed.

In an example scenario, APs 10, 20 with overlapping coverage areas 14, 24 may have 8 antenna elements and STAs 11, 12, 21, 22 2 antenna elements. STAs 11 and 12 may be associated to AP 10 and STAs 21 and 22 to AP 20. An antenna element may comprise at least one antenna port and an antenna may comprise multiple antenna elements. It is to be noted that alternatively one antenna may be considered to comprise one antenna element (and port) and thus separate antennas may be applied for beamforming and null steering purposes.

AP 10 and AP 20 may be configured to agree, in an initial coordination phase, to facilitate spatial reuse for the inter-BSS devices. AP 10 may obtain a transmission opportunity (TXOP) and schedule STA 11 and STA 12 for uplink transmission with 2 uplink spatial streams per STA. The AP 10 may be further configured to place nulls to enable spatial reuse for neighboring inter-BSS devices 20, 21, 22. However, when assuming that one antenna element needs to be dedicated to place one radiation null, AP 10 does not have enough antenna elements to both configure 4 spatial streams from its associated STAs 11, 12 and place radiation nulls to enable spatial reuse for all of the neighboring inter-BSS devices 20, 21, 22. This is because AP 10 should place 8 radiation nulls to suppress all incoming interference from AP 20 and AP 10 should place 4 radiation nulls to suppress all incoming interference from STA 21 and STA 22.

There is now provided an improved solution facilitating to take further advantage of interference mitigation and resulting channel access opportunities provided by null steering during subsequent data transmission, to further enhance spatial reuse and to avoid the above problem.

Figure 2:
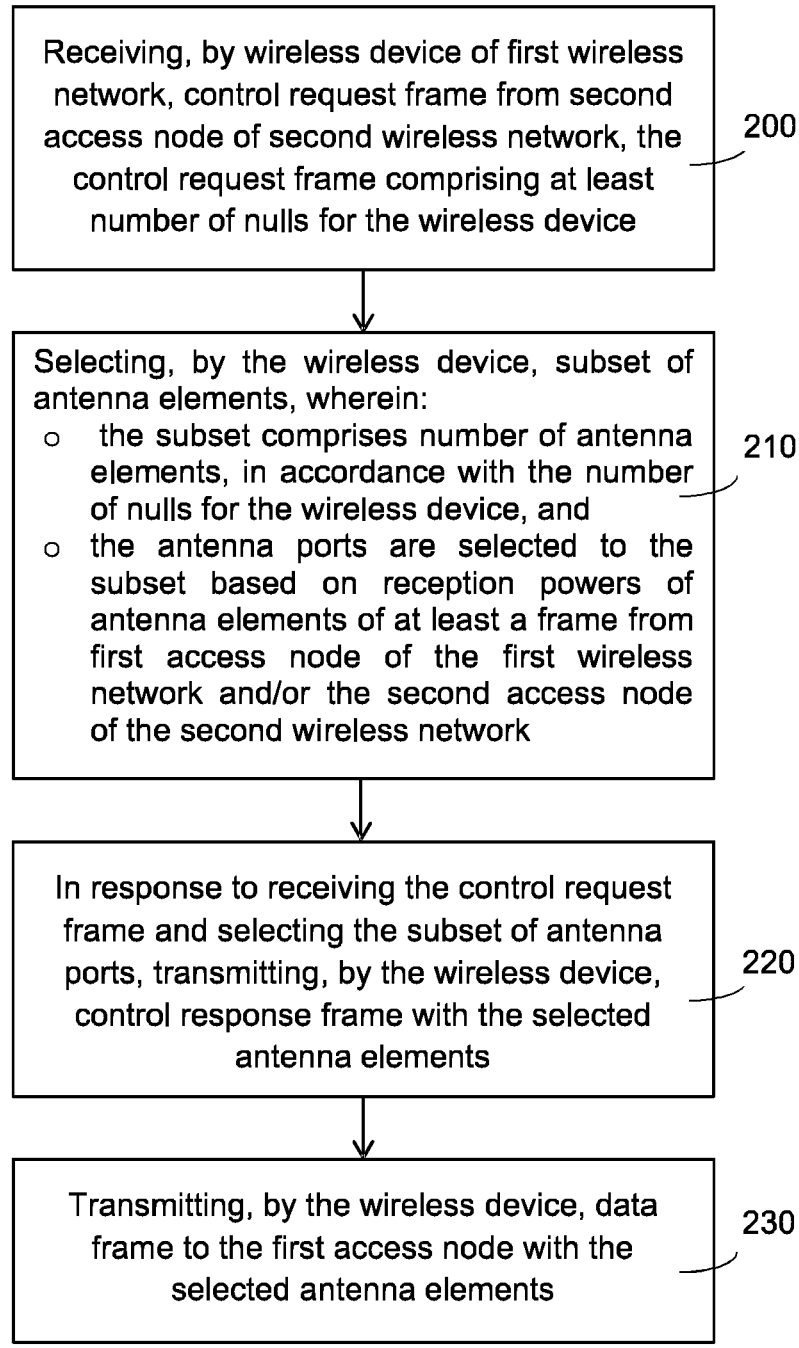
FIGS. 2 and 3 illustrate methods in accordance with at least some embodiments.

FIG. 2 illustrates a method for facilitating spatial reuse. The method may be performed in an apparatus controlling wireless transmission of or comprising a wireless device, such as the STA 21, 22 or a controller thereof.

The method comprises receiving 200, by a wireless device of a first wireless network, a control request frame from a second access node of a second wireless network, the control request frame comprising at least a number of nulls for the wireless device. The control request frame may refer to a frame or message for indicating or causing initiation of calibration or sounding operations. The control request frame may indicate use of beamforming and/or null steering in a subsequent (non-omnidirectional) transmission. For example, STA 21 may receive an inter-BSS null data packet (NDP) trigger request transmitted by the AP 10 for channel state information (CSI) acquisition purposes, to enable the subsequent null steering.

The wireless device selects 210 a subset of antenna elements, wherein:
  the subset comprises a number of antenna elements, wherein the number of antenna elements is in accordance with the number of nulls for the wireless device, and
  the antenna elements are selected to the subset based on reception powers of antenna elements of at least a frame from at least one of a first access node of the first wireless network and the second access node of the second wireless network. Thus, wireless device may be configured to measure reception power levels of a frame from the first access node and/or a frame from the second access node as received by multiple antenna elements. The antenna elements may be selected to the subset on the basis of identified antenna element specific reception power levels, in accordance with applied antenna element selection configuration parameters. For example, the configuration may prioritize null-steering accuracy in response to detecting received power levels below a threshold (indicative of low or medium reception power level) from the second access node, and select a sub-set of antenna elements that received the control request frame with highest power, to transmit the subsequent control response frame to the second access node to improve CSI acquisition by the second access node.

In response to receiving the control request frame and selecting the subset of antenna elements, the wireless device transmits 220 a control response frame with the selected antenna elements. The control response frame may be a calibration or sounding (response) frame, in some embodiments an NDP frame, applied by the receiving device to obtain the CSI for subsequent null steering. A signal comprising such calibration message may comprise a predefined waveform in time. The control response frame may be transmitted to the second access node and/or the first access node, for the node to determine CSI.

The wireless device transmits 230 a data frame to the first access node with the selected antenna elements. Block 230 may be entered after detecting a trigger frame from the second access node after block 220. The trigger frame from the second access node generally refers to a frame or message for triggering, and thus indicative of, a transmission in the second wireless network, such as a basic trigger frame in 802.11 based network.

The number of nulls for the wireless device may indicate how many nulls the second access node configures to reduce interference from the wireless device. In some embodiments, the control request frame indicates number of nulls specifically for each wireless device of a number of wireless devices. For example, AP 10 may indicate in an inter-BSS control request frame a number of nulls for STA 21 and another number of nulls for STA 22.

The selection of the sub-set of antenna elements may refer to selection of one or more antenna ports or even selection of an antenna (in case of multiple antennas providing the set of antenna elements). The number of the antenna elements selected for the sub-set may be configured to be equal to the number of nulls indicated in the received control request frame. The wireless device, of another network than the second access node transmitting the control request frame, may determine in block 210 the specific antenna elements that will transmit the control response frame, such as the NDP. Thus, the wireless device may provide CSI only for the number of antenna elements indicated by the second access node. The selection may be dependent on targeted communication enhancement or design target, such as uplink transmission quality or null steering accuracy. For example, the wireless device may be configured to prioritize null placement accuracy of the second access node, signal power towards the first access node, or increased probability of finding a spatial reuse opportunity.

Block 210 may be preceded by a decision block of determining whether to perform block 210 and the selecting the subset of antenna elements for transmitting the control response frame. The determining may be performed on the basis of characteristics of signals received by the wireless device from the first access node and the second access node, such as the detected reception powers of the signals.

In some embodiments, beamforming is applied to transmit 220 the control response frame to the first access node or the second access node. This may be applied in cases where the wireless device has more antenna elements available than the number of nulls indicated in the control request frame. The beamforming may be applied towards the second access node for transmitting the control response frame, enabling to further improve CSI acquisition towards the second access node and subsequent null steering accuracy by the second access node. The beamforming may be applied towards the first access node for transmitting the control response frame for enhancing the CSI acquisition and subsequent data transmission with the first access node through the signal power increase. In an example embodiment, beamforming is selected as alternative to entering block 210 and selecting the antenna elements towards the respective first or second access node.

In some embodiments, the control request frame comprises immediate reuse control information indicating whether at least the wireless device may contend immediately after detecting the trigger frame.

Figure 3:
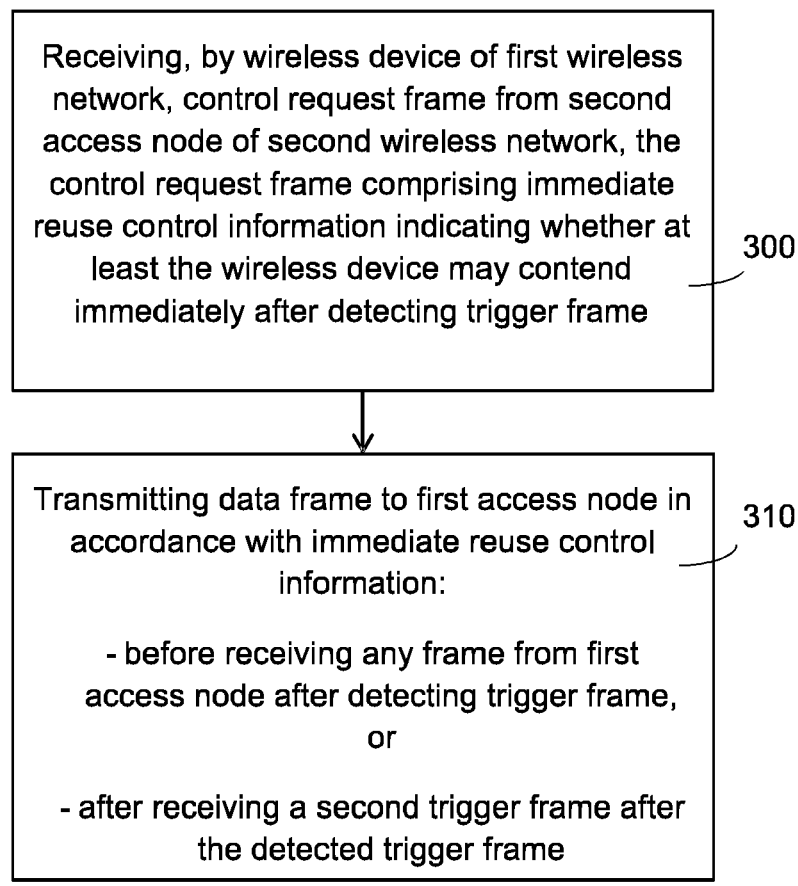

FIG. 3 illustrates a method for facilitating spatial reuse. The method may be performed in an apparatus controlling wireless transmission of or comprising a wireless device, such as the STA 21, 22 or a controller thereof.

The method comprises receiving 300, by a wireless device of a first wireless network, a control request frame from second access node of second wireless network. The control request frame may comprise immediate reuse control information indicative of whether at least the wireless device may contend immediately after detecting trigger frame (without having to wait for further trigger) or only later upon a further trigger. A data frame, e.g. the data frame of block 230, is transmitted 310 to first access node in accordance with the immediate reuse control information either:

before receiving any frame from first access node after detecting trigger frame, or
  after receiving a second trigger frame after the detected trigger frame.

It is to be noted that there may be a specific intermediate block(s) between blocks 300 and 310 of determining if the wireless device may contend for channel access immediately or not and then, based on the determination, initiating channel access contention instantly or only upon detecting the trigger frame.

The second access node of the second wireless network may be configured to perform a method comprising: generating a control request frame comprise immediate reuse control information indicating whether at least the wireless device of the first wireless network may contend immediately after detecting trigger frame, and transmitting the control request frame to the wireless device for controlling timing of subsequent channel contention timing by the wireless device.

For example, on the basis of the immediate reuse control information received from the AP 10, the STA 21, that finds a spatial reuse opportunity (enabled by null steering by the AP 10), may either immediately contend for channel access to initiate a transmission in the subsequent data transmission/reception phase, or has to wait for the associated AP 20 to contend and schedule uplink transmissions for the STA 21 and then send a trigger frame to the STA 21. The method of FIG. 3 may be performed separate from or in connection with the method of FIG. 2, as illustrated in below examples.

Presently disclosed features facilitate to provide an efficient implementation of coordinated null steering in scenarios where devices, towards which radiation nulls are steered to, are equipped with multiple antenna elements. Efficient and coordinated use of null steering during the subsequent data transmission enables to further enhance spatial reuse. Enhanced spatial reuse facilitates improved latency and data throughput.

The wireless device may be associated with the first access node and a station of a WLAN, such as 802.11ax or 802.11be based network. The access nodes may be WLAN access points. For example, in case of IEEE802.11-based RAT, very high throughput (VHT) or high-efficiency (HE) sounding protocol may be used. The control request frame may be or comprise an inter-BSS NDP trigger request or NDP announcement and the control response frame may be or comprise an NDP. The control request frame may be or comprise a sounding or calibration start or announcement frame of an applied 802.11 sounding exchange procedure and the control response frame may thus be or comprise a sounding or calibration signal.

Figure 4:
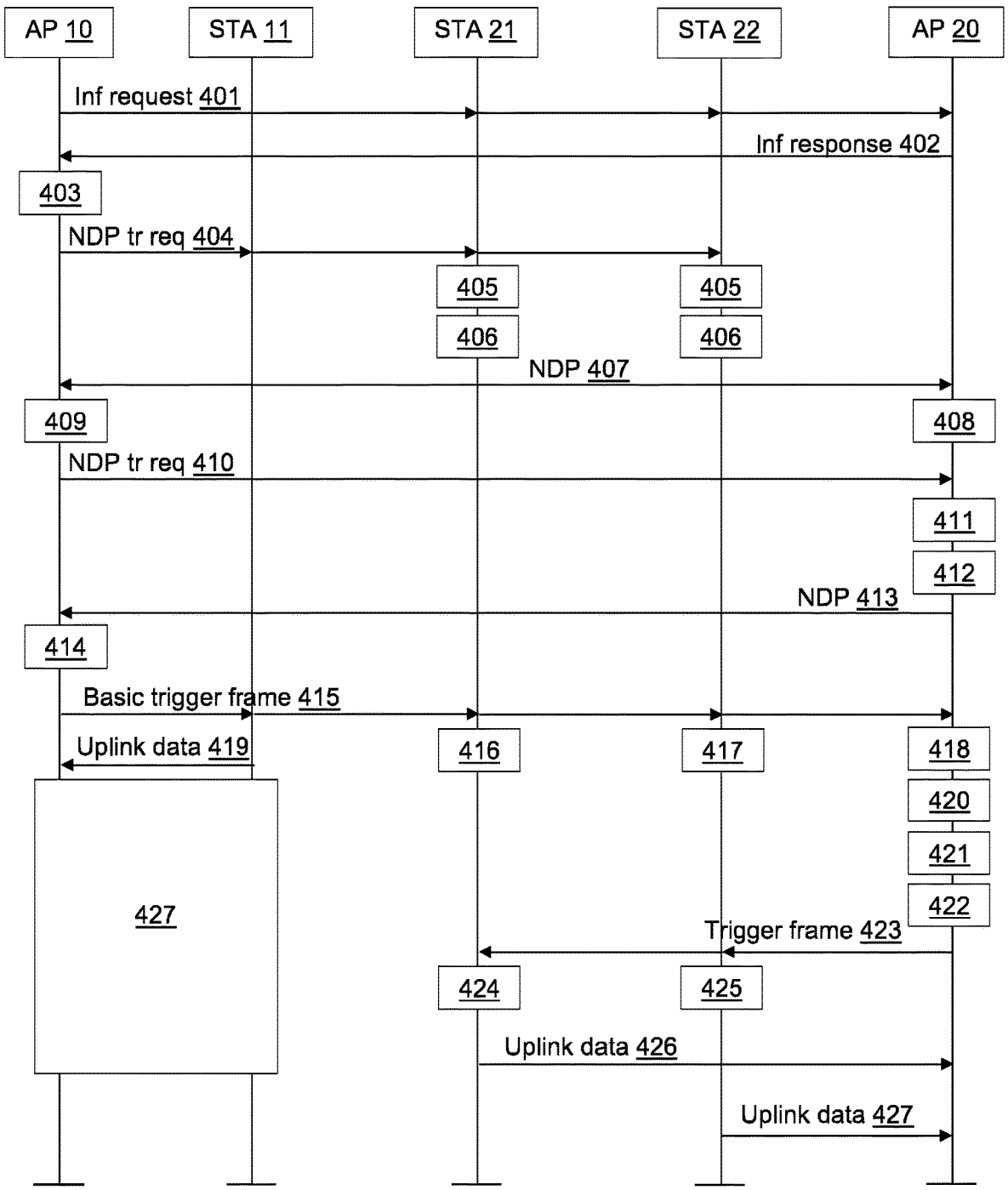
FIG. 4 illustrates signaling examples in accordance with at least some embodiments.

FIG. 4 illustrates signaling examples for IEEE 802.11 based system, with references to entities of FIG. 1, STAs 21 and 22 operating in the role of the wireless device, AP 20 as the first access node, and AP 10 as the second access node.

The AP 10 may initially make a scheduling decision with spatial reuse. For example, the AP 10 may schedule the STA 11 for uplink transmission with uplink spatial stream(s) and decide to facilitate spatial reuse for inter-BSS devices 20, 21, and 22.

As first stage (Stage 1, comprising events 401, 402 and 403), the (inter-BSS) APs 10 and 20 may coordinate for null steering. This may comprise the AP 10 transmitting an information request frame 401 to some or all of the inter-BSS devices 20, 21, and 22. One or more of the inter-BSS devices 20, 21, and 22 may respond with an information response frame 402 (only one illustrated response frame illustrated due to simplicity), which allows the AP 10 to determine towards which inter-BSS devices radiation nulls will be steered to. In some embodiments, one or more of the inter-BSS devices may be configured to indicate that there is data to be transmitted in the respective BSS.

In an embodiment, the AP 20 is configured to coordinate and determine which devices have data to transmit in its BSS and indicate this to the AP 10 by the information response frame 402. The information request 401 may be an inter-network beamforming setup request, upon which the AP 20 may be configured to determine the STA 21 and/or 22, e.g. based on received measurement reports to be added to beamforming cooperation and transmit beamforming address setup request to the determined STA(s). AP 10 may indicate one or more STAs (not associated to the AP 10 but detected based signal measurements) in the inter-network beamforming setup request. The information response frame may be an inter-network beamforming setup response indicating the STAs determined to be added to beamforming cooperation.

In the present example, the AP 20 may indicate in the response message 402 that its uplink buffer information indicates that STA 21 and STA 22 have data to transmit. The AP 20 may be configured to provide null-steering control or coordination information to the AP 10 regarding some or all of the devices in its BSS (24). For example, the AP 20 may indicate in the response message 402 that one null should be steered to the AP 20 and one null to both STA 21 and STA 22, since they have data to transmit.

On the basis of received inter-BSS device information, in the present example the information response 402 received from the AP 20, AP 10 determines 403 spatial reuse (control) information, which may comprise determining devices to be nulled (i.e. towards which (inter-BSS) radiation null(s) will be steered to) and determining number of nulls for the nulled devices. For example, the AP 10 may determine that it will:
  a) steer one or more radiation nulls towards the AP 20 to enable and protect itself from AP 20 transmission of the trigger frame for the subsequent uplink data transmission (one null may suffice to transmit the omnidirectional trigger frame),
  b) steer one or more radiation nulls to the STA 21, and
  c) steer or more radiation nulls to the STA 22 to enable and protect itself from their uplink data transmission.

It is to be noted that above only some example embodiments for arranging inter-BSS null-steering cooperation was illustrated. The provision of inter-BSS information and control of inter-BSS null steering may be performed through other means, e.g. a wired connection between AP 10 and AP 20 or a central controller.

In second stage (Stage 2, comprising events 404 to 405), CSI acquisition for inter-BSS null steering is initiated and associated inter-BSS null steering control transmitted for selected devices to be nulled. The AP 10 transmits an NDP trigger request frame 404 (as the control request frame) to initiate an implicit CSI acquisition phase. This NDP trigger request frame may indicate:
  a) number of radiation nulls that will be placed per inter-BSS device (APs/STAs), and/or
  b) immediate reuse control information: whether inter-BSS devices (APs and/or STAs) should refrain from immediately contending for channel access for initiating a transmission during subsequent data transmission (in the other BSS 14).

In block 405 the STA 21 and 22 may determine if they may immediately contend for channel access during subsequent data transmission in the BSS 14 initiated by the AP 10 (419, 427), (i.e. during shared transmission period). In the present example, the NDP trigger frame 404 transmitted by the AP 10 indicates that
  a) The AP 10 will place the determined one or more radiation nulls to the AP 20 (to enable (and protect itself from) the transmission of the control trigger frame for uplink scheduling by the AP 20), the determined one or more radiation nulls to STA 21, and the determined one or more radiation nulls to the STA 22. This indication could be done implicitly based on the uplink time/frequency resources allocated for the subsequent NDP transmission.
  b) Even if STA 21 and STA 22 find a spatial reuse opportunity thanks to placement of radiation nulls, they may not immediately contend for uplink channel access to initiate a transmission.

Although the NDP trigger request frame 404 is illustrated not to be transmitted to the AP 20, in another embodiment also the AP 20 may receive it and update associated STA 21 and 22 information accordingly. Furthermore, the NDP trigger request frame 404 does not have to be transmitted to the intra-BSS STA 11, the AP 10 may have CSI available from STA 11 from previous transmission.

The use of the inter-BSS immediate reuse control allows various advantages over a legacy behaviour in which the AP 20 (for scheduling the STA 21 and STA 22 in uplink), the STA 21, and STA 22 would simultaneously contend for channel access. For example, there could be situations where the STA 21 or STA 22 win the contention process to the AP 20 and start performing an uplink transmission. In these cases, only the STA that gained channel access (either STA 21 or STA 22) would perform an uplink transmission during the spatial reuse opportunity. This is more inefficient spatial reuse than letting AP 20 contend for channel access and schedule both the STA 21 and STA 22 in uplink, which is feasible when there exists inter-AP coordination and the number of radiation nulls per device has been agreed prior to initiating the spatial reuse opportunity.

Furthermore, the probability of collision may be reduced when the number of devices immediately contending for channel access is reduced by applying the inter-BSS immediate reuse control information. To control this, in the present example the AP 10 may indicate in the NDP trigger frame 404 that only the AP 20 contends for channel access, as illustrated below in connection with Stage 4.

Stage 3 in the present example comprises events 406 to 414, including antenna element selection for devices that will try to find spatial reuse opportunities.

Upon reception of the NDP trigger (request) frame 404, addressed inter-BSS devices 21, 22 may measure reception power per antenna element. On the basis of the associated control information in the NDP trigger frame 404 and the reception power levels, the STAs 21, 22 may select 406 the specific antenna element(s) that will be used to transmit the NDP 407 for the AP 10 (only single NDP event being illustrated for simplification). AP 10 obtains CSI 409 based on received NDPs. The AP 20 may also receive the NDPs 407 and is able to obtain CSI 408 from STAs 21 and 22.

In the example of FIG. 4, the AP 10 also transmits an NDP trigger request 410 for AP 20. Similarly as illustrate above for STAs 21, 22, the AP 20 may, based on the information in the NDP trigger request 410, determine 411, on the basis of immediate reuse control information in the NDP trigger request 410, if it is allowed to immediately contend for channel access during subsequent data transmission. On the basis of the associated control information in the NDP trigger request 410 and the reception power levels, the AP 20 may select 412 the specific antenna element(s) that are then used to transmit NDP 413 for the AP 10. The AP 10 obtains CSI 414 for the AP 20 based on the received NDP 413.

It is to be noted that use of separate NDP trigger frames (and subsequent actions 405-407 and 411-413) is optional. For example, a single NDP trigger request may be transmitted to all inter-BSS devices 20, 21, 22, which may then perform the actions 405-407 and 411-413. In another example, the AP 20 may utilize the information obtained by the STAs 21, 22.

Stage 3 may thus comprise:

3a): The number of antenna elements that the inter-BSS device 20, 21, 22 selects 406, 412 to transmit the NDP 407, 413 in orthogonal time/frequency resources is determined by the number of radiation nulls per device indicated in the NDP trigger frame 404, 410.

3b): The inter-BSS device STA 20, 21, 22 with more antenna elements than number of radiation nulls allocated may determine to transmit the NDP 407, 413 using beamforming or select a subset of antenna elements for transmitting the NDP to AP 10. This may be an implementation decision, and may depend on the device capabilities (e.g., transmit power, spatial signal processing features) and/or wireless propagation characteristics between such device (e.g. STA 21) and both the serving/associated access node (e.g. AP 20) and the device placing the radiation null(s) (e.g. AP 10).

Figure 5A:
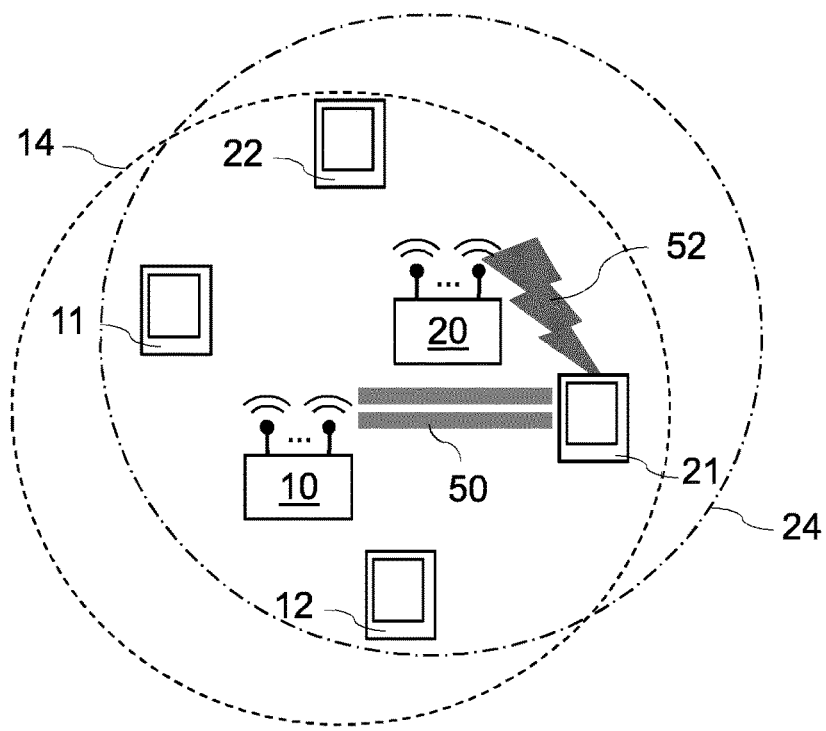
FIGS. 5a, 5b, 6a, 6b, and 7 illustrate signaling examples in accordance with at least some embodiments.

Some further simple examples on how the antenna element selection may be differently optimized are illustrated below with references to FIGS. 5a to 7b. In the example of FIG. 5a, STA 21 has a strong uplink wireless link 52 with AP 20. This may indicate that uplink communication phase will be performed with highest modulation and coding scheme (MCS) level, but a medium-strength uplink wireless link 50 with AP 10.

Figure 5B:
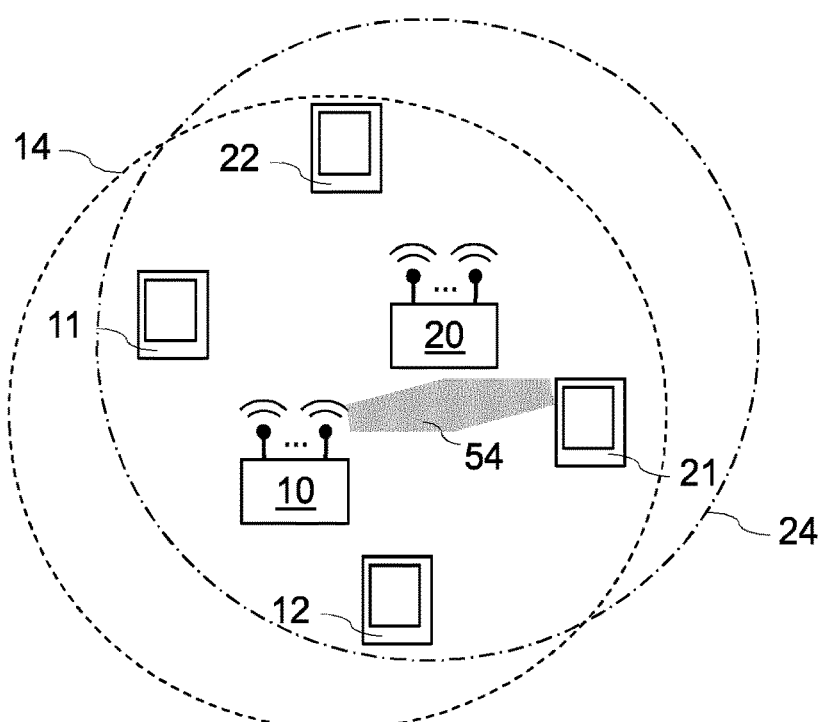

As illustrated in FIG. 5b, in this situation STA 21 may maximize performance by beamforming 54 the NDP (e.g. 407 in FIG. 4) towards AP 10, comprising the CSI acquired with the previous NDP trigger frame (406). Alternatively, or additionally to the beamforming, STA 21 may select (210, 406) antenna element(s) that received the NDP trigger frame with largest power to enhance CSI acquisition towards AP 10 and thus API's null placement accuracy. This is because the likelihood of finding a spatial reuse opportunity and the maximum transmission power that can be utilized during such spatial reuse opportunity increases with the accuracy of the radiation null. Not much gain would be expected if the link between STA 21 and AP 20 would be enhanced, since the highest MCS level is utilized already.

Figure 6A:
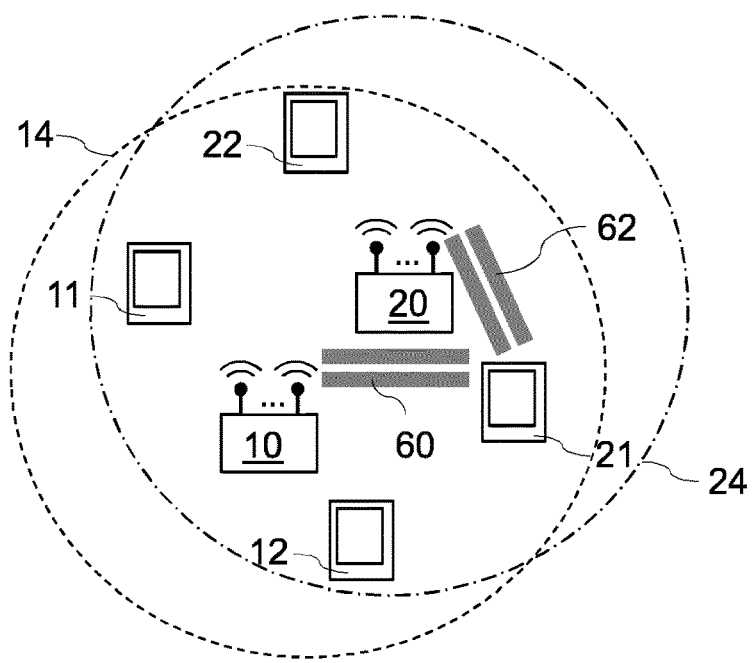

In the example of FIG. 6a, STA 21 has a medium-strength wireless link 62 with AP 20. This may indicate that the uplink communication phase will likely be performed with an intermediate MCS level. STA 21 has a medium-strength uplink wireless link 60 with AP 10 that suffices for an accurate CSI acquisition. STA 21 may infer that the uplink with AP 10 is strong enough for an accurate CSI acquisition e.g. on the basis of information transmitted by AP 10 in the NDP trigger request 410, since it may include the uplink target received signal strength indicator (RSSI) based on the received NDP 407.

Figure 6B:
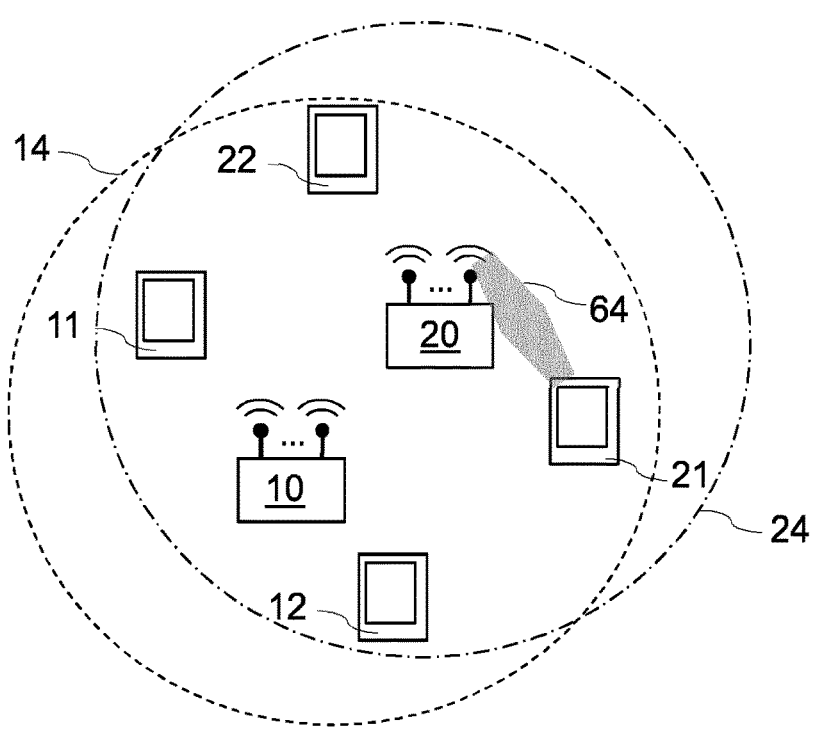

In this another example embodiment of Stage 3b, as illustrated in FIG. 6b, STA 21 may maximize performance by selecting beamforming 64 for subsequent data transmission (230, 426) towards AP 20 on the basis of CSI available from previous transmissions. This enables to enhance CSI acquisition and the subsequent data transmission with AP 20 through a signal power increase. Not much gain would be expected by enhancing the link 60 between STA 21 and AP 10, since the CSI accuracy satisfies the needs of AP 10 and, consequently, there exists a high likelihood of finding a spatial reuse opportunity where a large transmission power can be utilized.

Figure 7:
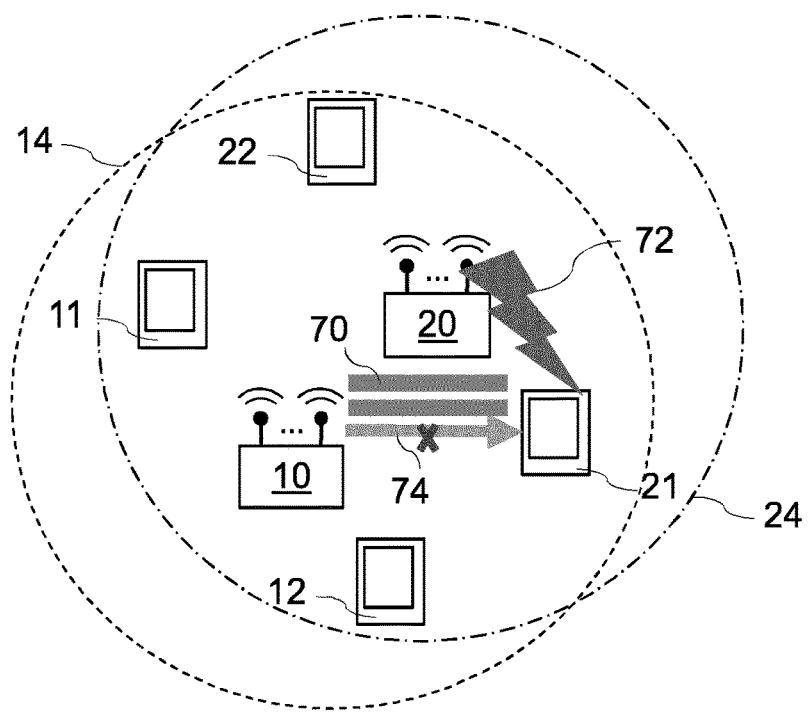

FIG. 7 illustrates a third example scenario, in which STA 21 has a strong link 72 with AP 20, which may indicate that the uplink communication phase will be performed with the highest MCS level. STA 21 has a medium-strength uplink 70 with AP 10, sufficient for providing the CSI acquisition accuracy requested by AP 10. Further, in this example AP 10, despite having accurate CSI, cannot place precise radiation nulls due to other imperfections, as illustrated by non-accurate radiation null transmission 74. For example, this may be due to lack of adequate calibration between the uplink and downlink hardware RF components.

In this further example embodiment of Stage 3b), STA 21 targets to increase the probability of finding a successful spatial reuse opportunity by selecting the subset of antenna elements that received the NDP trigger frame 404 with lowest power. This enables to increase the probability of finding a spatial reuse opportunity upon reception of the subsequent basic trigger frame 415 (enabling it), and/or facilitate the utilization of a larger transmission power during such spatial reuse opportunity. This is because the maximum transmission power increases when the received power level during the reception of the basic trigger frame enabling spatial reuse is reduced. Other examples of Stage 3 may be based on other combination(s) of above-illustrated features. It is also to be noted that at least some of the above-illustrated features may be applied in other nodes and the antenna element selection may be arranged in other non-AP nodes (e.g. STA 22)

Returning to FIG. 4, Stage 4 comprises events 415 to 420 and includes decision-making (in 416, 417, and 418), on the basis of the immediate reuse control information, if immediate channel access contention may be initiated for devices finding a spatial reuse opportunity. Inter-BSS devices STA 21, 22 and AP 20 receive basic trigger frame 415 from AP 10. The basic trigger frame 415 may be adapted for a) scheduling a primary uplink data transmission 419 from STA 11, and b) enabling spatial reuse for inter-BSS devices. The inter-BSS devices STA 21, 22 and AP 20 may determine whether spatial reuse is possible during the subsequent primary uplink transmission. If they detect that spatial reuse is possible, they respectively determine 416, 417, 418 if they are allowed to immediately contend for channel access or not, depending on the indication provided by AP 10 during Stage 2 (NDP trigger request 404).

In the present example, only AP 20 is enabled by the AP 10 to immediately contend 420 for channel access to facilitate uplink MU-MIMO scheduling of STA 21 and STA 22 (coordinated access).

Stage 5 comprises events 421 to 427 and illustrates antenna element selection enforcement for devices that can perform spatial reuse transmission. Upon gaining channel access, inter-BSS devices that gained a spatial reuse opportunity, enabled by null steering, will only utilize the antenna elements towards which radiation nulls were steered to, as determined in Stage 3. Thus, the same beamformer as used for transmitting the NDP in Stage 3 may be used.

In the present example, AP 20 may schedule 421 an uplink transmission from STA 21 and STA 22 based on their CSI acquired during Stage 3 and select 422 the antenna element(s) that transmitted the uplink pilot during the CSI acquisition phase (413). AP 20 transmits basic trigger frame 423 with the selected antenna element. In response to the trigger frame 423, STA 21 and STA 22 select 424, 425 the same antenna element(s) as used for transmitting the uplink pilot during the CSI acquisition phase (NDP 407) and transmit their scheduled uplink transmission 426, 427 with the selected antenna element(s).

It is to be noted that at least some of the stages and embodiments illustrated above in connection with FIG. 4 may be applied separately. For example, the antenna element selection based on the indicated number of nulls and the channel contend decision based on the (immediate reuse) control information from the AP 10 may be applied separately from each other. Further, one or more stages or steps of FIG. 4 may be optional. For example, stage 1 and message exchange 401, 402 may be optional. There are various alternatives available for arranging the preparation for null-steering and simultaneous transmissions in the neighbouring BSSs, for which the presently disclosed method of FIGS. 2 and/or 3 may be applied.

For example, in one example embodiment, the control request frame/NDP trigger frame 404 may be an announcement frame indicating at least one STA 21, 22 for channel sounding. The AP 10 may then perform channel sounding for the null steering towards such STA(s). Accordingly, the AP 10 may transmit the announcement frame indicating STA 21 and/or STA 22 and, subsequently, a channel sounding signal.

For example, upon STA 21 receiving the announcement frame from AP 10 (which may be identified in a beamforming address set configured to the STA 21 in connection with stage 1) and subsequently detecting the identifier of STA 21 in the announcement frame, STA 21 may perform the measurements on the channel sounding signal and compute the channel state information, as specified in the announcement frame. STA 21 may select the subset of antenna elements as illustrated in connection with block 406. The selected subset may then be used for receiving the sounding signal and thus determine CSI depending on the subset of antenna elements and/or beamforming that may be utilized during the subsequent data transmission stage. STA 21 may determine a format of the channel state information on the basis of the announcement frame. STA 21 may transmit the beamforming report comprising the channel state information to AP 10 upon receiving a beamforming report request (indicating STA 21) from AP 10. The beamforming report may in this embodiment be the control response frame of block 220. The control response frame may thus comprise information on the selected antenna elements.

In some embodiments, the control request frame may comprise further characteristics information on the subsequent beamforming and/or null steering. In an embodiment, signal detection threshold, such as the SD in 802.11 based networks, is adaptable and adapted in response to the received information in the control request frame 200. This enables to have a channel access rule with adaptive signal detection threshold that can be tuned according to associated null steering characteristics from the second access node. For example, the signal detection threshold is adapted on the basis of a least one of the number of beams, the number of null radiation nulls, and/or the target (e.g. device identifier, area or direction) of null radiation nulls in the received null steering information. For example, the larger the number of radiation nulls placed by the transmitter, the larger the signal detection threshold should be at the receiver, since there exists a greater likelihood of having channel access opportunities during the non-omnidirectional 2nd transmission. Complementarily, when the wireless device determines based on the received null steering information that radiation nulls have been specifically steered towards it, a large SD threshold could be used. As a result of such channel access rule, the chances of concurrent transmission increases.

In some embodiments, the information on the number of nulls for wireless device(s) and/or the immediate reuse control information is included in a preamble field of 802.11 PPDU. A new frame type may be defined for a PDU, such as the 802.11 PPDU, comprising the information on the number of nulls for wireless device(s) and/or the immediate reuse control information.

In some embodiments, the wireless devices are Extremely High Throughput (EHT) devices. EHT is discussed in an IEEE 802.11 EHT topic interest group (TIG) on new 802.11 features for bands between 1 and 7.125 GHz. The EHT's primary objective is to increase peak throughput and cell efficiency as well as to reduce latency to support high throughput and low latency applications, such as video-over-WLAN, augmented reality (AR) and virtual reality (VR). Such EHT devices may apply more spatial streams, increased bandwidth, and multiband switching, aggregation and operation.

New EHT-specific data may be included (to include e.g. the number of nulls for wireless device(s) and/or the immediate reuse control information) in an omnidirectionally-transmitted EHT preamble, to allow an EHT device that uses null steering in the PPDU transmission to indicate the number of nulls for wireless device(s) and/or the immediate reuse control information. Other EHT devices may use this new data in the EHT preamble of a received PPDU for frame classification and subsequent control actions 210, 310. A new EHT-specific field may be specified for the new information, and introduced into the omnidirectionally-transmitted EHT preamble of the PPDU. Such inter-BSS beamformed frame may be specified as a sub-class of inter-BSS EHT frames.

While some embodiments have been described in the context of IEEE 802.11 based systems, it should be appreciated that these or other embodiments of the invention may be applicable in connection with other technologies configured to operate on licensed or non-licensed band, such as with wireless devices operating according to other versions of the IEEE 802.11, 3GPP LTE (Long-term Evolution for Universal Mobile Tele-communication System), LTE-Advanced, or a fifth generation cellular communication system (5G).

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device), a wearable device, a base station, access point device or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 8:
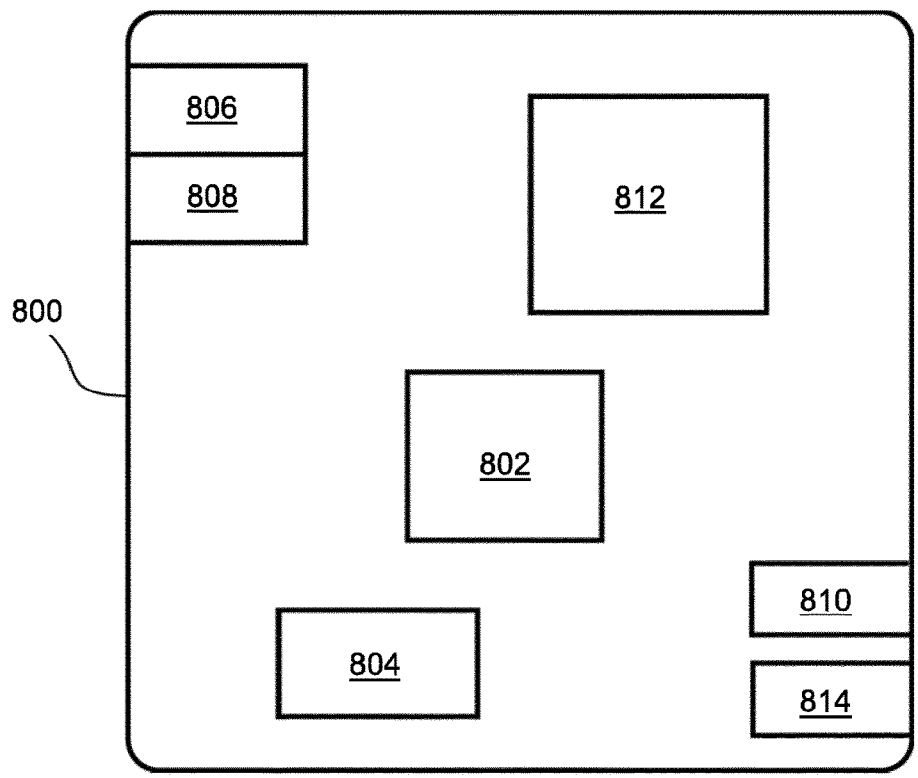
FIG. 8 illustrates an example apparatus capable of supporting at least some embodiments.

FIG. 8 illustrates an example apparatus capable of supporting at least some embodiments of the present invention. Illustrated is a device 800, which may comprise a communications device arranged to operate as the STA 21 or 22, for example. The device may include one or more controllers configured to carry out operations in accordance with at least some of the embodiments illustrated above, such as some or more of the features illustrated above in connection with FIGS. 2 to 7. The device may be configured to operate as the apparatus configured to carry out the method of FIGS. 2 and/or 3, for example.

Comprised in the device 800 is a processor 802, which may comprise, for example, a single- or multi-core processor wherein a single-core processor comprises one processing core and a multi-core processor comprises more than one processing core. The processor 802 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 800 may comprise memory 804. The memory may comprise random-access memory and/or permanent memory. The memory may comprise at least one RAM chip. The memory may comprise solid-state, magnetic, optical and/or holographic memory, for example. The memory may be at least in part accessible to the processor 802. The memory may be at least in part comprised in the processor 802. The memory 804 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 800 but accessible to the device. For example, control parameters affecting operations related to the antenna selection and/or data transmission based on the immediate reuse control information may be stored in one or more portions of the memory and used to control operation of the apparatus. Further, the memory may comprise device-specific cryptographic information, such as secret and public key of the device 800.

The device 800 may comprise a transmitter 806. The device may comprise a receiver 808. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, WLAN, and/or Ethernet standards, for example. The device 800 may comprise a near-field communication, NFC, transceiver 810. The NFC transceiver may support at least one NFC technology, such as NFC, Bluetooth, Wibree or similar technologies.

The device 800 may comprise user interface, UI, 812. The UI may comprise at least one of a display, a keyboard, a touchscreen, a vibrator arranged to signal to a user by causing the device to vibrate, a speaker and a microphone. A user may be able to operate the device via the UI, for example to accept incoming calls, to originate telephone calls or video calls, to browse the Internet, to manage digital files stored in the memory 804 or on a cloud accessible via the transmitter 806 and the receiver 808, or via the NFC transceiver 810, and/or to configure the device.

The device 800 may comprise or be arranged to accept a user identity module or other type of memory module 814. The user identity module may comprise, for example, a subscriber identity module, SIM, and/or a personal identification IC card installable in the device 800. The user identity module 814 may comprise information identifying a subscription of a user of device 800. The user identity module 814 may comprise cryptographic information usable to verify the identity of a user of device 800 and/or to facilitate encryption and decryption of communication effected via the device 800.

The processor 802 may be furnished with a transmitter arranged to output information from the processor, via electrical leads internal to the device 800, to other devices comprised in the device. Such a transmitter may comprise a serial bus transmitter arranged to, for example, output information via at least one electrical lead to memory 804 for storage therein. Alternatively to a serial bus, the transmitter may comprise a parallel bus transmitter. Likewise the processor may comprise a receiver arranged to receive information in the processor, via electrical leads internal to the device 800, from other devices comprised in the device 800. Such a receiver may comprise a serial bus receiver arranged to, for example, receive information via at least one electrical lead from the receiver 808 for processing in the processor. Alternatively to a serial bus, the receiver may comprise a parallel bus receiver.

The device 800 may comprise further devices not illustrated in FIG. 8. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 810 and/or the user identity module 814.

The processor 802, the memory 804, the transmitter 806, the receiver 808, the NFC transceiver 810, the UI 812 and/or the user identity module 814 may be interconnected by electrical leads internal to the device 800 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising:
   at least one processor, and
   at least one non-transitory memory storing instructions that, when executed by the at least one processor, cause the apparatus at least to:
      receive a control request frame from a second access node of a second wireless network, where the apparatus is part of a first wireless network, and where the control request frame comprises at least a number of nulls for the apparatus,
      select a subset of antenna elements, wherein the subset comprises a number of antenna elements in accordance with the number of nulls for the apparatus, and the antenna elements are selected to the subset based on reception powers of one or more antenna elements of at least a frame from at least one of a first access node of the first wireless network or the second access node of the second wireless network,
      in response to receipt of the control request frame and selection of the subset of antenna elements, transmit a control response frame with the selected antenna elements, and
      transmit a data frame to the first access node with the selected antenna elements.

2. The apparatus of claim 1, wherein the instructions, when executed by the at least one processor, cause the control response frame to be transmitted to at least one of the second access node or the first access node.

3. The apparatus of claim 1, wherein the instructions, when executed by the at least one processor, further cause the apparatus to perform: beamforming the control response frame to the first access node or the second access node.

4. The apparatus of claim 1, wherein the control request frame comprises immediate reuse control information indicating whether at least the apparatus may contend immediately after detecting a trigger frame.

5. The apparatus of claim 4, wherein the instructions, when executed by the at least one processor, further cause the apparatus at least to:
   in response to the immediate reuse control information indicating that the apparatus is allowed to contend immediately after detecting the trigger frame, transmit the data frame before receipt of any frame, after detection of the trigger frame, from the first access node, and
   in response to the immediate reuse control information indicating that the apparatus is not allowed to contend immediately after detecting the trigger frame, transmit the data frame after receipt of a second trigger frame, after detection of the trigger frame, from the first access node.

6. The apparatus of claim 1, wherein the control request frame comprises a null data packet trigger request and the control response frame is or comprises a null data packet.

7. The apparatus of claim 1, wherein the control request frame indicates number of nulls specifically for each apparatus of a number of apparatuses.

8. The apparatus of claim 1, wherein the number of nulls for the apparatus indicates how many nulls the second access node configures to reduce interference from the apparatus.

9. The apparatus of claim 1, wherein the instructions, when executed by the at least one processor, cause the data frame to be transmitted to the first access node after detecting a trigger frame from the second access node.

10. The apparatus of claim 1, wherein the apparatus is a station associated with the first access node, the first and second access nodes are access points according to IEEE 802.11 and the wireless networks are wireless local area networks according to IEEE 802.11.

11. A method comprising:
receiving, at an apparatus that is part of a first wireless network, a control request frame from a second access node of a second wireless network, the control request frame comprising at least a number of nulls for the apparatus,
selecting, by the apparatus, a subset of antenna elements, wherein the subset comprises a number of antenna elements in accordance with the number of nulls for the apparatus, and the antenna elements are selected to the subset based on reception powers of antenna elements of at least a frame from at least one of a first access node of the first wireless network or the second access node of the second wireless network,
in response to receipt of the control request frame and selecting the subset of antenna elements, transmitting, by the apparatus, a control response frame with the selected antenna elements, and
transmitting, by the apparatus, a data frame to the first access node with the selected antenna elements.

12. The method of claim 11, wherein the control response frame is transmitted to at least one of the second access node or the first access node.

13. The method of claim 11, comprising: beamforming the control response frame to the first access node or the second access node.

14. The method of claim 11, wherein the control request frame comprises immediate reuse control information indicating whether at least the apparatus may contend immediately after detecting a trigger frame.

15. The method of claim 11, wherein the control request frame is or comprises a null data packet trigger request and the control response frame is or comprises a null data packet.

16. The method of claim 11, wherein the control request frame indicates number of nulls specifically for each apparatus of a number of apparatuses.

17. The method of claim 11, wherein the number of nulls for the apparatus indicates how many nulls the second access node configures to reduce interference from the apparatus.

18. The method of claim 11, wherein the data frame is transmitted by the apparatus to the first access node after detection of a trigger frame from the second access node.

19. The method of claim 11, wherein the apparatus is a station associated with the first access node, the first and second access nodes are access points according to IEEE 802.11 and the wireless networks are wireless local area networks according to IEEE 802.11.

20. A non-transitory computer readable medium having stored thereon a set of computer readable instructions that, when executed by at least one processor, cause an apparatus to:
receive, at the apparatus that is part of a first wireless network, a control request frame from a second access node of a second wireless network, the control request frame comprising at least a number of nulls for the apparatus,
select a subset of antenna elements, wherein the subset comprises a number of antenna elements in accordance with the number of nulls for the apparatus, and the antenna elements are selected to the subset based on reception powers of antenna elements of at least a frame from at least one of a first access node of the first wireless network or the second access node of the second wireless network,
in response to receipt of the control request frame and selection of the subset of antenna elements, transmit a control response frame with the selected antenna elements, and
transmit a data frame to the first access node with the selected antenna elements.

* * * * *